United States Patent
Basteck et al.

(10) Patent No.: US 8,039,977 B2
(45) Date of Patent: Oct. 18, 2011

(54) DRIVE TRAIN FOR AN IMMERSION ENERGY PRODUCTION SYSTEM

(75) Inventors: Andreas Basteck, Lorrach (DE); Bernhard Ludas, Aalen (DE)

(73) Assignee: Voith Patent GmbH, Heidenheim (DE)

( * ) Notice: Subject to any disclaimer, the term of this patent is extended or adjusted under 35 U.S.C. 154(b) by 584 days.

(21) Appl. No.: 12/053,907

(22) Filed: Mar. 24, 2008

(65) Prior Publication Data

US 2008/0265579 A1 Oct. 30, 2008

(30) Foreign Application Priority Data

Apr. 30, 2007 (DE) .......................... 10 2007 020 615

(51) Int. Cl.
*F03D 7/00* (2006.01)
(52) U.S. Cl. ........................................... 290/44; 290/55
(58) Field of Classification Search ............... 290/43, 290/44, 54, 55; 416/170 R, 180, 197 C
See application file for complete search history.

(56) References Cited

U.S. PATENT DOCUMENTS

| | | | | |
|---|---|---|---|---|
| 4,160,170 A | * | 7/1979 | Harner et al. | 290/44 |
| 4,189,648 A | * | 2/1980 | Harner | 290/44 |
| 4,938,323 A | * | 7/1990 | Holler et al. | 188/296 |
| 6,826,907 B2 | * | 12/2004 | Obser et al. | 60/330 |
| 6,913,437 B2 | * | 7/2005 | Vogelsang et al. | 415/66 |
| 7,081,689 B2 | * | 7/2006 | Tilscher et al. | 290/44 |
| 2005/0146141 A1 | * | 7/2005 | Basteck | 290/44 |
| 2007/0007769 A1 | | 1/2007 | Basteck | |
| 2008/0101865 A1 | * | 5/2008 | Basteck et al. | 405/76 |

FOREIGN PATENT DOCUMENTS

| | | |
|---|---|---|
| DE | 454 729 | 1/1928 |
| DE | 36 607 | 11/1965 |
| DE | 17 75 654 | 4/1975 |
| DE | 103 14 757 | 11/2004 |
| DE | 10 2004 058 258 | 6/2006 |
| WO | WO 2004/088132 A1 * | 10/2004 |
| WO | 2007/053036 | 5/2007 |

OTHER PUBLICATIONS

Office Action dated Feb. 8, 2008 in corresponding German Application No. 10 2007 020 615.3.

* cited by examiner

*Primary Examiner* — Tho D Ta
(74) *Attorney, Agent, or Firm* — Baker & Daniels LLP

(57) ABSTRACT

The invention relates to a power generation plant, driven by a water current, comprising
 a water turbine;
 an electric generator;
  a drive train between the water turbine and the electric generator.
The invention is characterized in that the drive train comprises a controllable hydrodynamic coupling for exclusive transmission of power to the electric generator.

16 Claims, 2 Drawing Sheets ns of current fluctuations, a speed-constant drive of
DRIVE TRAIN FOR AN IMMERSION ENERGY PRODUCTION SYSTEM The invention relates to a drive train for a submarine power generation plant which is driven by the flow of water currents, especially an ocean current. The invention further relates to an operating method for such a power generation plant.

Submarine power generation plants stand freely in a water current irrespective of any dam structures. Such plants are used especially for power generation from ocean currents and especially preferably for utilizing tidal currents. The relevant components of such a submarine power generation plant are a water turbine and an electric generator which are typically integrated in a gondola or are arranged to revolve about the same. The gondola is usually fastened to a support structure which is either arranged on the ground of the ocean as a foundation or is held by a floating unit which is held in position by means of a tie rod system.

In most water currents used for power generation, fluctuations in the flow conditions occur. Such a change in the kinetic energy available in the ambient flow is especially present in ocean currents. For example, in tidal currents there is a cyclic progression of the flow current speed including a reversal of the direction of current. Moreover, the average flow current speed is superimposed by fluctuations that are not negligible. This temporally variable supply of power leads to the difficulty that a water turbine driven by the ambient flow current has a variable revolving speed and in the simplest of cases it is necessary to configure the generator in a frequency-variable way in order to achieve high efficiency in the case of a direct connection between a water turbine and an electric generator. Frequency converters which on their part are power components of the machine susceptible to malfunctions are typically used for network connection and speed control.

It was therefore proposed in DE 10 2004 058 258 A1 to arrange a generic power generation plant with an electric generator with direct network connection which revolves in a frequency-constant way during normal operation. In order to connect a variable-speed water turbine with such a frequency-constant electric generator it is proposed in the cited specification that a power-splitting drive train is arranged, such that the power-splitting gear divides power to two power branches which on the output side come into connection by means of a hydrodynamic component which adjusts the gear ratio of the power-splitting gear and the ratio of power splitting for realizing a frequency-locked drive of the electric generator.

The disadvantageous aspect of a power-split arrangement of a drive train for a generic submarine power generation plant is the high constructional complexity and the lack of possibility to reverse the direction of rotation. In addition, the solution disclosed by DE 10 2004 058 258 A1 does not offer any possibility to make any locking via the drive train itself when reaching the nominal power maximum of the power generation plant. For this purpose it is necessary to change the geometry of the water turbine or its pitch angle relative to the current in such a way that power take-up from then ambient current is limited. In the case of a water turbine arranged in the form of a propeller, a change in pitch angle is usually made for this purpose. The constructional and control efforts in connection with this measure is often undesirable with respect to a failure-proof design of the plant and leads to a construction of the water turbine which leads to high costs and requires a high amount of maintenance.

The invention is based on the object of providing a generic submarine power generation plant which is characterized by simple robust construction. For this purpose, the drive train of the power generation plant should be arranged in such a way that even in the case of flow current conditions that are variable over time, especially in the case of cyclic currents and the occurrence of current fluctuations, a speed-constant drive of an electric generator and its direct connection to a network is enabled. Moreover, a power generation plant is provided which can be guided from standstill to network-synchronous operation and which enables locking without any change of the geometry or the pitch angle of the water turbine relative to the ambient current when reaching the nominal power maximum.

In order to achieve the object as mentioned above, the inventors have recognized that it is necessary to interpose between the water turbine and the electric generator a controllable hydrodynamic coupling for transmitting the power flow. A hydrodynamic coupling comprises at least one primary wheel which is used as a pump wheel and at least one secondary wheel which is called a turbine wheel and to which the transmission of moment is performed. A hydrodynamic coupling does not comprise any guide wheel, so that the toroidal flow of the working medium which is revolved in the toroidal working chamber of the hydrodynamic coupling transmits a reaction moment to the secondary wheel which corresponds to the moment applied by the primary wheel as a result of the balance of moments. The primary wheel will always have a higher speed than the secondary wheel because a certain slip in the hydrodynamic coupling is necessary for transmitting the moment. The moment which can be transmitted by the hydrodynamic coupling depending on the present slip can be determined in a family of characteristics for the coefficient of performance $\lambda$. The coefficient of performance $\lambda$ depends on the degree of filling of the hydrodynamic coupling with working medium, as a result of which its controllability is realized.

The drive of the controllable hydrodynamic coupling by the water turbine preferably occurs in an indirect way, which means a speed step with a fixed gear ratio is provided in the drive train between the water turbine and the controllable hydrodynamic coupling for the efficient operation of the hydrodynamic coupling.

The controllable hydrodynamic coupling is provided with a straight blading according to a preferred embodiment. This allows the circulation of the hydrodynamic coupling in both directions of rotation. It is thus also possible to also have the water turbine rotate in both directions, which thus opens the possibility to arrange the power generation plant with a water turbine that does not follow up and to still take power from an inflow with variable direction, especially from a tidal current with a change of current direction by 180°. It is necessary for this case however to arrange the geometry of the water turbine in such a way that inflow from different directions is possible and the direction of rotation of the water turbine will only change as a result of a change in the current direction.

According to an alternative embodiment, the controllable hydrodynamic coupling is provided with an oblique blading. This is advantageous with respect to higher efficiency in comparison with a straight blading. Moreover, the influence of the short-circuit moment of the electric generator on the drive train will decrease. In this case however the water turbine can merely be operated in one direction of rotation, so that a follow-up of the power generation plant must be provided for a change in the inflow direction.

In the normal operational state of a frequency-constant electric generator locked to the electric network, there will be a support of the substantially constant rotation speed of the electric generator via the electric network, so that depending on the power supply to the electric generator the moment transmitted by the drive train in accordance with the invention and thus the slip of the hydrodynamic coupling will vary. This allows compensating impulses in the moment which are produced by fluctuations in the flow speed in the water current, with the hydrodynamic coupling further increasing the inertia inherent to the system.

By adjusting the degree of filling of the working medium in the controllable hydrodynamic coupling it is possible to adjust the speed ratio between the primary and the secondary side depending on the moment taken up by the water turbine. It is thus possible to adjust its power input through a purposeful adjustment of the rotational speed of the water turbine at a predetermined speed of the ambient current flow. This will be explained by reference to a preferred operating method for power locking when reaching the nominal power maximum of the power generation plant.

The speed of the water turbine is moved to higher values with increasing power input. At the same time, the moment transmitted by means of the controllable hydrodynamic coupling to the electric generator increases until a predetermined limit value for the power generation plant is reached, which will be designated below as nominal power maximum. In accordance with the invention, the power generation plant is decelerated in this case in such a way that a portion of the working medium is taken from the controllable hydrodynamic coupling and a speed and moment jump is performed as a result of the changed degree of filling in the family of characteristics for coefficient of performance λ, which means that the moment transmitted by the hydrodynamic coupling follows a changed dependence on slip. This will lead on the primary side to a higher speed and result in a changed power coefficient of the same as a result of the faster rotating water turbine. When the revolving speed of the water turbine is increased to such an extent that the range of a decreasing power coefficient of the water turbine is reached, there is a reduction of the power take-up of the water turbine from the ambient current flow and thus a desired locking effect by the water turbine.

A further embodiment of an operating method in accordance with the invention through which an influence on the revolving speed of the water turbine and/or the speed of the electric generator is made by means of regulating the hydrodynamic coupling via a control of the degree of filling relates to the start-up of the power generation plant from standstill up to synchronization and network connection. For this purpose, the water turbine and the gear with fixed gear ratio preferably provided between the water turbine and the controllable hydrodynamic coupling is brought up to speed from standstill or low speed at first with a substantially discharged hydrodynamic coupling. Once this has occurred, there will be a controlled or regulated filling of the hydrodynamic coupling with working medium, so that the components which follow downstream on the secondary side of the hydrodynamic coupling, which means especially that the electric generator, also runs up. The revolving speed of the generator is set in such a way through an adjustment of the degree of filling in the controllable hydrodynamic coupling that in the case of a synchronous generator a slightly supersynchronous operation is realized on the side of the water turbine. Asynchronous generators require a different regulation strategy. The electric generator is subsequently connected to the network, with such connection occurring at a sufficiently small phase angle deviation in the case of a synchronous generator.

The invention is now explained in closer detail by reference to preferred embodiments shown in the drawings. The figures show the following in detail:

Figure 1:
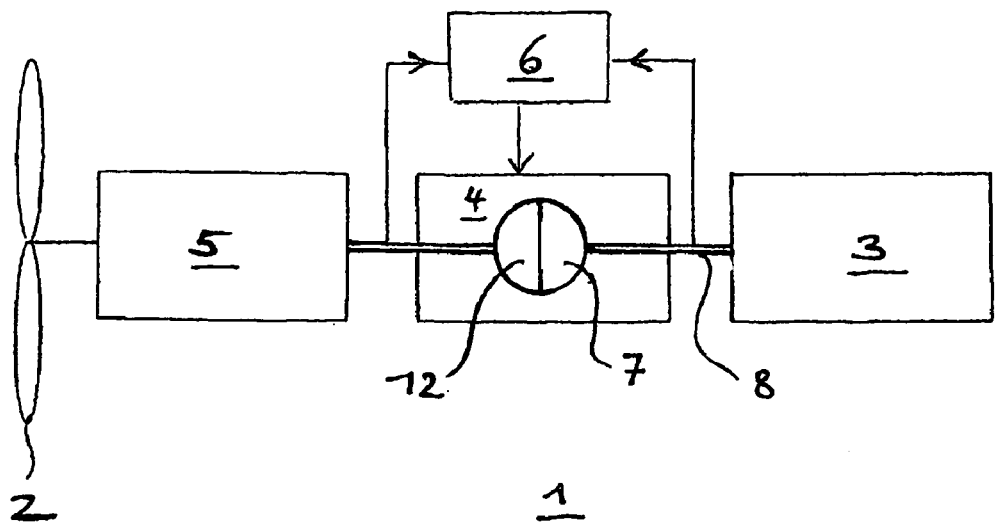
FIG. 1 shows a schematic simplified view of a drive train of a generic power generation plant with a controllable hydrodynamic coupling for transmitting the power flow from the water turbine to the generator.
Figure 4:
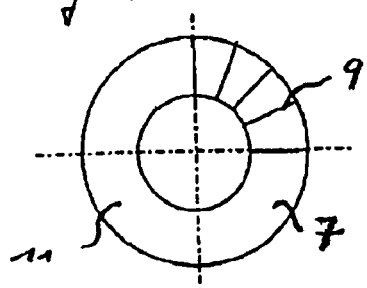
FIG. 4 shows a schematically simplified plan view of a secondary wheel of a controllable hydrodynamic coupling with a straight blading for one embodiment of the invention.
Figure 5:
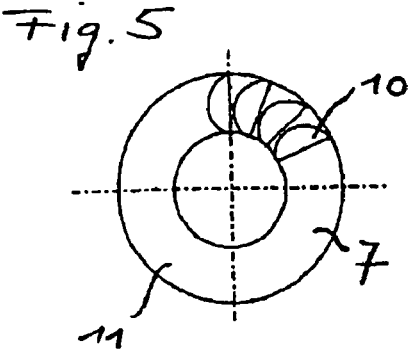
FIG. 5 shows a schematically simplified plan view of a secondary wheel of a controllable hydrodynamic coupling with an oblique blading for a further embodiment of the invention.

FIG. 1 shows a schematic simplified view of the arrangement of the drive train 1 of a power generation plant in accordance with the invention. Reference numeral 2 designates a water turbine which can be arranged in the manner of a propeller for example. Water turbine 2 drives an electric generator 3 indirectly. It can either be a synchronous generator or an asynchronous generator. The number of poles is adjusted to the chosen speed of the electric generator which is constant during normal operation. In the present case, a six-pole machine is used for example. In accordance with the invention, a controllable hydrodynamic coupling 4, having a primary wheel 12 and a secondary wheel 7, is interposed in the drive train 1 between the water turbine 2 and the electric generator 3 for power transmission. Regulation occurs via adjustment of the degree of filling with working medium in the working chamber 11 of the controllable hydrodynamic coupling 4. The apparatuses for setting the degree of filling can be arranged within the scope of expertise by persons skilled in the art. For example, scooping pipes or valves are used for this purpose. They are not shown in detail in FIG. 1. An open-loop/closed-loop control unit 6 is provided for adjusting the degree of filling of the controllable hydrodynamic coupling 4. According to a preferred embodiment, the same is supplied with at least a first parameter which characterizes the revolving speed of the water turbine 2 and a second parameter from which the speed of the electric generator can be derived.

According to a preferred embodiment, a gear unit 5 with a fixed gear ratio is interposed between the typically slow-running water turbine 2 and the coupling for efficient operation of the controllable hydrodynamic coupling 4. The speed of the water turbine 2 is increased by a factor in the range of 80 to 100 for the present embodiment. Depending on the system configuration it is also possible to choose another ratio, especially an even larger one in order to enable operating the hydrodynamic coupling 4 in an efficient way.

The controllable hydrodynamic coupling 4 can have a straight blading 9. This leads to the advantage that rotation in both directions of rotation is possible, so that the water turbine 2 can accordingly be driven in different directions of rotation. In the alternative case that water turbine 2 revolves in only one direction (e.g. when there is no relevant change in direction of the ambient current flow or the water turbine follows up with the current), it is possible to provide an oblique blading 10 for the controllable hydrodynamic coupling, which increases efficiency.

The use of a controllable hydrodynamic coupling 4 allows damping moment impulses which are taken up by the water turbine 2 by fluctuation of the ambient current flow. At the same time, the controllable hydrodynamic coupling contributes to damping oscillations of the electric generator 3. Oscillations can be incited via the drive train 1 or from the network side, e.g. via network flickering.

The drive train 1 in accordance with the invention allows operation with constant frequency of the electric generator with simultaneous variable revolving speed of the water turbine. This is produced by a change in the slip and thus the speed ratio from primary side to secondary side as a result of a change of the moment transmitted from the hydrodynamic coupling 4. This concerns according to a first case a controllable hydrodynamic coupling 4 which is set during normal operation to a certain degree of filling and which follows a certain progression of the ratio of slip to torque in the family of characteristics of the λ values. A transition between the different λ characteristics can be made in addition by open-loop or closed-loop control of the degree of filling of the working chamber with working medium of the controllable hydrodynamic coupling 4. This is especially necessary for operating methods in which there are special operating situations. This will be explained below by reference to two examples concerning the synchronization and locking of a power generation plant in accordance with the invention.

Based on a power generation plant with a static electric generator 3 and a discharged hydrodynamic coupling 4 in the drive train 1, the water turbine and the further components arranged on the primary side to the controllable hydrodynamic coupling 4 such as the gear unit with fixed gear ratio 5 are brought up to speed. Up until a nominal speed is reached (supersynchronous relative to the generator), a discharged hydrodynamic coupling 4 or a low partial filling is used. After the run-up of the water turbine 2, there is a regulated or controlled filling of the controllable hydrodynamic coupling 4, with such a guidance of the degree of filling being predetermined by the open-loop/closed-loop control unit 6 in such a way that the speed of the shaft 8 of the electric generator 3 is run up until a revolving speed is achieved which in the case of a synchronous generator corresponds approximately to synchronous operation and in the case of an asynchronous generator to a revolving speed which corresponds to the frequency of the electric network. The activation of the electric generator then occurs, with a minimization of the phase angle deviation being made in the case of synchronous generators prior to activation.

The case of a high load input up to the predetermined limit of nominal power maximum for the power generation plant is now discussed for further advantageous operational guidance. For this purpose, FIG. 2 shows the progression of power take-up for water turbine 2 in relationship to speed.

Up to speed $n_1$ there is a desired rise in power up to the predetermined nominal power maximum $P_{max}$ and locking of the power generation plant is necessary. In accordance with the invention, no change is made to the water turbine 2 or its position of attack relative to the current. Instead, locking is achieved by means of the controllable hydrodynamic coupling 4 which is used in accordance with the invention in the drive train 1. For this purpose, the hydrodynamic coupling 4 is partly discharged, so that in the λ family of characteristics there is a displacement to another characteristic for the ratio between torque and slip. This jump in the characteristic leads to an increase in the speed. FIG. 2 shows the speed $n_2$ in an exemplary manner and a curve progression in a broken line between the speed $n_1$ which is associated with the first filling level and the nominal power maximum $P_{max}$, and the speed $n_2$. This means in other words that the water turbine 2 accelerates to a higher speed for locking, with the higher speed being chosen in such a way that a range in the performance coefficient diagram of the water turbine is reached in that the power take-up is reduced. This is shown in FIG. 3.

Figure 2:
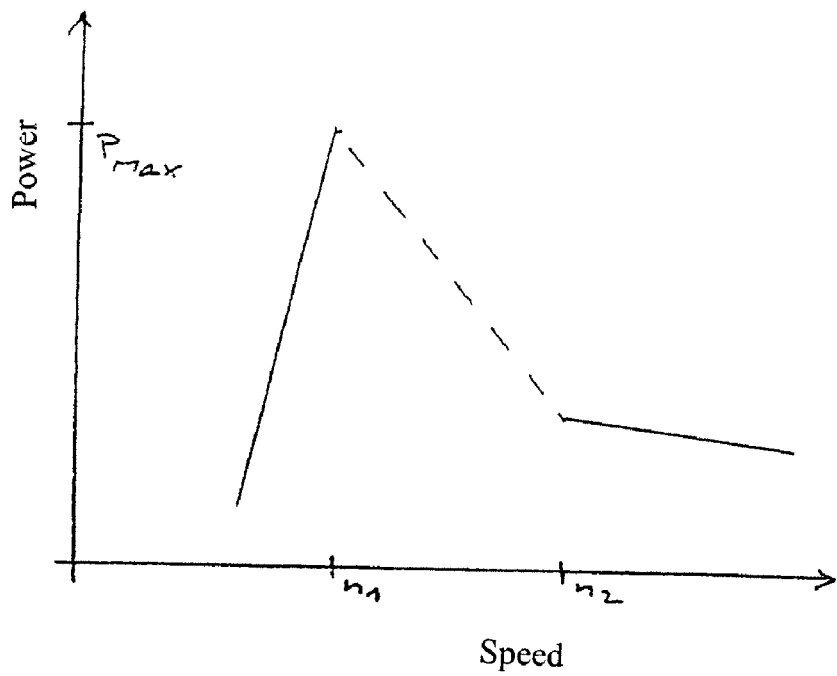
FIG. 2 shows on the basis of a speed/output diagram the operating method in accordance with the invention for locking the power generation plant when reaching the nominal power maximum.
Figure 3:
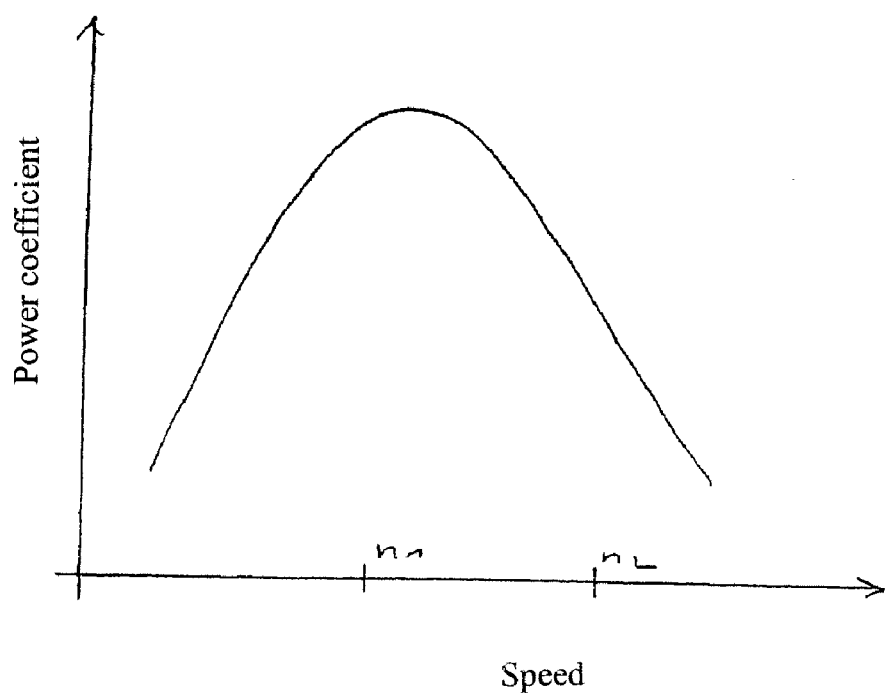
FIG. 3 shows a schematically simplified view of the progression of the performance coefficient of the water turbine in relationship to the speed.

The exemplary chosen speeds of FIG. 2 ($n_1$ and $n_2$) are again shown. It can be seen that the speed $n_1$ is associated with a higher performance coefficient than the larger speed $n_2$, which means the water turbine 2 is guided to revolving speed range in which it can take up kinetic energy from the ambient current flow in a less efficient way. As a result, the power input into the drive train 1 in accordance with the invention decreases as desired.

A further development of the invention within the scope of expert knowledge of a person skilled in the art is possible. It is especially possible to provide further components for power transmission in the drive train 1 of the power generation plant in accordance with the invention on the primary side and/or secondary side to the controllable hydrodynamic coupling 4. These can be gear components with fixed gear ratios or further hydrodynamic components. It is further possible to use more than one hydrodynamic coupling 4 in the drive train and to operate the same in an alternating manner depending on power range or parallel with each other.

LIST OF REFERENCE NUMERALS

1 Drive train
2 Water turbine
3 Electric generator
4 Controllable hydrodynamic coupling
6 Step-up gear unit with constant gear ratio
6 Open-loop/closed-loop control unit
7 Secondary wheel
8 Drive shaft
9 Straight blading
10 Oblique blading
11 Working chamber
12 Primary wheel

The invention claimed is:

1. A power generation plant, driven by a water current, comprising:
    a water turbine;
    an electric generator; and
    a drive train between the water turbine and the electric generator, wherein the drive train comprises a gear unit with a fixed gear ratio, which is driven by the water turbine;
    the drive train further comprising at least one controllable hydrodynamic coupling interposed between the gear unit with a fixed gear ratio and the electric generator, said at least one hydrodynamic coupling being connected in series between said gear unit and said electric generator thereby exclusively transmitting power to the electric generator, wherein the at least one hydrodynamic coupling has a variable degree of filling with a working medium.

2. A power generation plant according to claim 1, wherein the electric generator is driven at a constant speed during normal operations and is connected directly to an electric network.

3. A power generation plant according to claim 1, wherein the controllable hydrodynamic coupling is associated with a closed-loop/open-loop control unit which controls or regulates a revolving speed of the water turbine and/or a speed of the electric generator by adjustment of a degree of filling with working medium of the controllable hydrodynamic coupling.

4. A power generation plant according to claim 1, wherein the controllable hydrodynamic coupling has a straight blading and the water turbine can be driven by an ambient current flow in both directions of rotation.

5. A power generation plant according to claim 1, wherein a secondary wheel of the controllable hydrodynamic coupling is directly connected with a drive shaft of the electric generator.

6. A power generation plant according to claim 1, wherein the controllable hydrodynamic coupling has an oblique blading.

7. A power generation plant according to claim 6, wherein the water turbine is made to follow up after a change of the inflow direction.

8. A power generation plant according to claim 1, wherein the controllable hydrodynamic coupling is regulated by setting the degree of filling with a working medium of the hydrodynamic coupling.

9. A power generation plant according to claim 8, wherein a secondary wheel of the controllable hydrodynamic coupling is directly connected with a drive shaft of the electric generator.

10. A power generation plant according to claim 8, wherein the electric generator is driven at a constant speed during normal operations and is connected directly to an electric network.

11. A power generation plant according to claim 8, wherein the controllable hydrodynamic coupling is associated with a closed-loop/open-loop control unit which controls or regulates a revolving speed of the water turbine and/or a speed of the electric generator by adjustment of a degree of filling with working medium of the controllable hydrodynamic coupling.

12. A power generation plant according to claim 1, wherein a secondary wheel of the controllable hydrodynamic coupling is connected in direct power transmitting fashion with a drive shaft of the electric generator.

13. A power generation plant according to claim 12, wherein the electric generator is driven at a constant speed during normal operations and is connected directly to an electric network.

14. A method for operating a power generation plant, comprising:
   providing a water turbine for taking up kinetic energy from an ambient current flow which drives an electric generator in an indirect way;
   providing a gear unit with a fixed gear ratio driven by the water turbine;
   providing at least one controllable hydrodynamic coupling for exclusive power transmission interposed between the gear unit with a fixed gear ratio and the electric generator, said at least one hydrodynamic coupling being connected in series between said gear unit and said electric generator thereby exclusively transmitting power to the electric generator; and
   adjusting a revolving speed of the water turbine and/or a speed of the electric generator by an open-loop or closed-loop control of a degree of filling with working medium of the at least one controllable hydrodynamic coupling.

15. A method according to claim 14, wherein during run-up of the power generation plant from standstill the water turbine and the drive train on a primary side of the hydrodynamic coupling are run up to a predetermined speed at first with the controllable hydrodynamic coupling being partially discharged, and after reaching the predetermined speed on the primary side there is a partial filling of the controllable hydrodynamic coupling with working medium, through which the electric generator is run up and is brought to synchronization speed by means of a filling degree control of the controllable hydrodynamic coupling, followed by a connection of the electric generator to an electric network.

16. A method according to claim 14, wherein upon reaching a nominal power maximum of the power generation plant a reduction of the degree of filling with working medium of the controllable hydrodynamic coupling is made, so that with increasing slip in the controllable hydrodynamic coupling an increasing revolving speed of the water turbine up to a range of a decreasing power coefficient results.

* * * * *